US012782869B2

(12) United States Patent
Lee et al.

(10) Patent No.: US 12,782,869 B2
(45) Date of Patent: Nov. 3, 2026

(54) METHOD FOR OPTIMIZING HOLOGRAPHIC DISPLAY AND DEVICE THEREFOR

(71) Applicant: SEOUL NATIONAL UNIVERSITY R&DB FOUNDATION, Seoul (KR)

(72) Inventors: Byoungho Lee, Seoul (KR); Byounghyo Lee, Seoul (KR); Dongyeon Kim, Seoul (KR); Seungjae Lee, Seoul (KR); Chun Chen, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 283 days.

(21) Appl. No.: 18/725,915

(22) PCT Filed: Jun. 28, 2022

(86) PCT No.: PCT/KR2022/009237
§ 371 (c)(1),
(2) Date: Jul. 1, 2024

(87) PCT Pub. No.: WO2023/128088
PCT Pub. Date: Jul. 6, 2023

(65) Prior Publication Data

US 2025/0085664 A1 Mar. 13, 2025

(30) Foreign Application Priority Data

Dec. 29, 2021 (KR) ........................ 10-2021-0191826

(51) Int. Cl.
*G03H 1/04* (2006.01)
*G03H 1/02* (2006.01)
*G03H 1/26* (2006.01)

(52) U.S. Cl.
CPC ........... *G03H 1/0443* (2013.01); *G03H 1/024* (2013.01); *G03H 1/26* (2013.01); *G03H 2240/41* (2013.01)

(58) Field of Classification Search
None
See application file for complete search history.

(56) References Cited

U.S. PATENT DOCUMENTS

2011/0251982 A1 10/2011 Dluhos et al.
2020/0379262 A1 12/2020 Peri
(Continued)

FOREIGN PATENT DOCUMENTS

KR 10-2018-0108288 A 10/2018
KR 10-2021-0013887 A 2/2021
(Continued)

OTHER PUBLICATIONS

Office Action for KR 10-2021-0191826 mailed Oct. 19, 2023, 9 pages (with English translation).
(Continued)

*Primary Examiner* — Derek S. Chapel
(74) *Attorney, Agent, or Firm* — Kilpatrick Townsend & Stockton LLP

(57) ABSTRACT

Provided are a method and apparatus for optimizing a holographic display. The holographic display back-propagates target field data including generating a predicted hologram by a plurality of planes in a depth direction to a complex plane of a spatial light modulator (SLM), converts the predicted hologram into a binary hologram, generates predicted field data by forward-propagating the binary hologram to a reproduction plane through an optical system simulation model, calculates a loss function between the predicted field data and the target field data, generates a new predicted hologram for the predicted field data by using a stochastic gradient descent (SGD) method to reduce a value of the loss function, and repeats the generation of the new
(Continued)

predicted hologram until the value of the loss function is less than a predefined threshold.

4 Claims, 7 Drawing Sheets

(56) References Cited

U.S. PATENT DOCUMENTS

| | | | |
|---|---|---|---|
| 2021/0326690 A1 | 10/2021 | Pégard et al. | |
| 2021/0389724 A1 | 12/2021 | Cossairt | |

FOREIGN PATENT DOCUMENTS

| | | | |
|---|---|---|---|
| KR | 10-2277100 | B1 | 7/2021 |
| KR | 10-2021-0126490 | A | 10/2021 |

OTHER PUBLICATIONS

M. Hossein Eybposh et al., DeepCGH: 3D computer-generated holography using deep learning. Optics Express vol. 28, No. 18 / Aug. 31, 2020 / p. 26636-26650. <doi.org/10.1364/OE.399624> Whole Document.

Lee et al., Development of Deep Learning-Based Holographic Ultrasound Generation Algorithm. The Journal of the Acoustical Society of Korea vol. 40, No. 2 (2021), p. 169-175 <doi.org/10.7776/ASK.2021.40.2.169> Whole Document.

International Search Report for PCT/KR2022/009237 mailed Sep. 30, 2022, 10 pages (with English translation).

Peng et al., Neural Holography with Camera-in-the-loop Training. ACM Trans. Graph., vol. 39, No. 6, Article 185, Dec. 2020, 14 pages.

METHOD FOR OPTIMIZING HOLOGRAPHIC DISPLAY AND DEVICE THEREFOR

TECHNICAL FIELD

Embodiments of the present disclosure relate to a holographic display, and more particularly, to a method and apparatus for optimizing a holographic display.

BACKGROUND ART

A general holographic display uses a coherent light source and a spatial light modulator to complex-modulate light waves and reconstruct a desired complex wavefront. The holographic display is a technology that is considered as one of next-generation displays in that it can computationally reconstruct the light waves. There are two important aspects of hologram computation: forward propagation computation of light waves and hologram encoding. The forward propagation computation of light waves is basically based on a Rayleigh-Sommerfeld diffraction integral equation and a light wave propagation equation derived therefrom. The hologram encoding proceeds differently depending on a driving method of a spatial light modulator (SLM), and a commercialized spatial light modulator adopts only amplitude modulation or phase modulation and thus needs to differently encode complex information corresponding thereto. In this way, there are direct and iterative methods of generating holograms based on forward propagation computation of light waves, hologram encoding, etc. The direct method is a method in which desired light waves are forward-propagated and are encoded according to a modulation scheme of an SLM. This method is excellent in terms of hologram acquisition speed because the entire calculation process is performed once, but the quality of the reproduced hologram is poor. The iterative method includes an iterative Fourier transform algorithm, a Gerchberg Saxton algorithm, and a stochastic gradient descent-based optimization method. The hologram acquired by optimization through this repetition of reproduction and reconstruction is superior in terms of the quality of a reproduced holographic image. This is because errors caused by forward propagation computation of light waves and hologram encoding may all be taken into account through the iterative method.

The holographic display is known as an ultimate display in that three-dimensional (3D) volume expression is possible through one SLM. However, various factors have an influence upon a two-dimensional (2D) quality of a holographic image and 3D expression, and have a corresponding trade-off relationship. Factors having an influence upon the quality of holograms may be roughly classified into three factors: the number of overlapping frames, a type of a light source, and a phase profile of a complex field to be reproduced.

When one holograph frame is reproduced using a laser light source and a phase of a reproduced complex field is uniformly distributed in a region $(-\pi, \pi]$, the quality of a 2D image is low due to severe speckle noise, but 3D expression is excellent. When the same hologram is reproduced with a light source having low coherence, the speckle noise is reduced, but the contrast of the 2D image decreases and the 3D expression also deteriorates. When holograms with a limited phase profile of a reproduced complex field are reproduced, speckle noise is stored and a 2D image having a high contrast is reproduced, but 3D expression deteriorates due to a narrow bandwidth. However, when the phase profile of the complex field is uniform in the region $(-\pi, \pi]$ and several holograms are reproduced overlappingly at high speeds while using a laser light source, then speckle noise may be reduced, such that the quality of the 2D image is good and 3D expression is not lost due to no limitation of the phase profile.

A conventional holographic display may overlap several hologram frames to obtain a speckle reduction effect without a loss of 3D expression. In this case, a binary SLM or a digital micromirror device that can be driven at high speeds is used. However, according to a conventional technique, direct hologram encoding rather than iterative optimization is performed to obtain a binary hologram. Due to imperfect holographic binary encoding, a binary holographic image has a low contrast value.

DISCLOSURE

Technical Problem

There is provided a method and apparatus for optimizing a holographic display by minimizing noise of binary holograms that can be driven fast.

Technical Solution

A method of optimizing a holographic display according to an embodiment of the present disclosure includes generating a predicted hologram by back-propagating target field data including a plurality of planes in a depth direction to a complex plane of a spatial light modulator (SLM), converting the predicted hologram into a binary hologram, generating predicted field data by forward-propagating the binary hologram to a reproduction plane through an optical system simulation model, calculating a loss function between the predicted field data and the target field data, generating a new predicted hologram for the predicted field data by using a stochastic gradient descent (SGD) method, and repeating the converting into the binary hologram to the generating of the new predicted hologram until a value of the loss function is less than a predefined threshold.

A holographic display according to an embodiment of the present disclosure includes a back-propagation unit configured to back-propagate target field data including a plurality of planes in a depth direction to a complex plane of a spatial light modulator (SLM) to generate a predicted hologram, a binarization unit configured to convert the predicted hologram into a binary hologram, a forward-propagation unit configured to generate predicted field data in which the binary hologram is forward-propagated to a reproduction plane by using an optical system simulation model, and an error identification unit configured to calculate a loss function between the predicted field data and the target field data, in which the back-propagation unit is further configured to generate a new predicted hologram for the predicted field data by using a stochastic gradient descent (SGD) method to reduce a value of the loss function, and the error identification unit repeats the generation of the new predicted hologram until the value of the loss function is less than a predefined threshold.

Advantageous Effects

According to an embodiment of the present disclosure, binary noise originating from binarization of a hologram may be reduced. Overlapping of hologram frames may be possible using a fast-driven display, thereby providing a high-contrast holographic image with reduced speckle noise.

MODE FOR INVENTION

Hereinafter, a method and apparatus for optimizing a holographic display according to an embodiment of the present disclosure will be described in detail with reference to the accompanying drawings.

Figure 1:
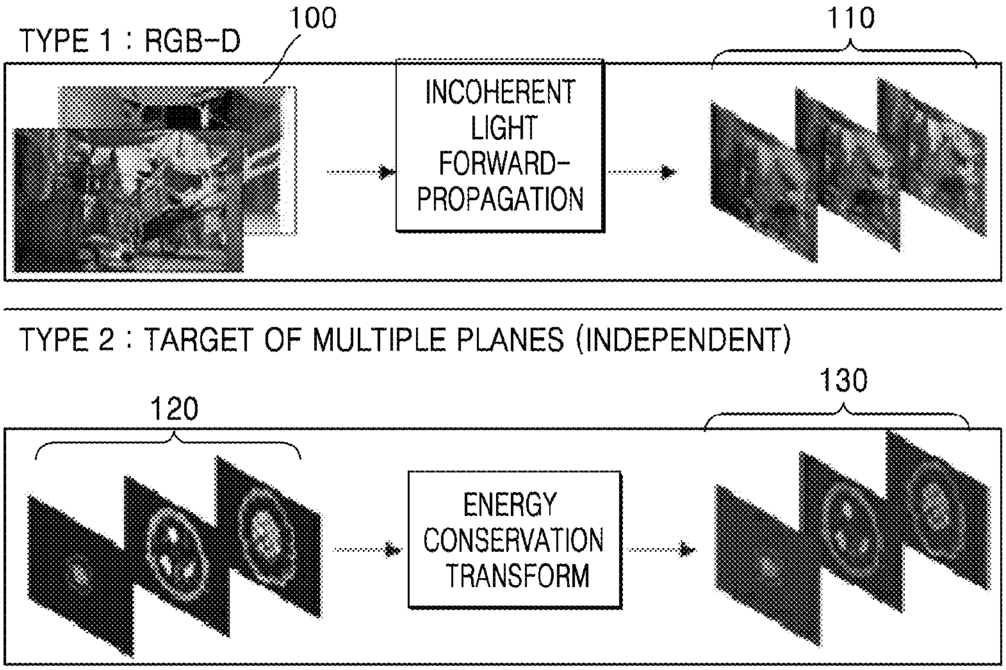
FIG. 1 illustrates an example of a method of generating a target image, according to an embodiment of the present disclosure.

FIG. 1 illustrates an example of a method of generating a target image, according to an embodiment of the present disclosure.

Referring to FIG. 1, target images 110 and 130 to be displayed on a space through a holographic display may be generated from a depth image 100 or an image 120 including multiple planes (e.g., a magnetic resonance imaging (MRI) image, a computed tomography (CT) image, etc.). The depth image 100 may be a color depth image of red, green, and blue (RGB) or a black/white depth image. Various methods of generating the target images 110 and 130 may also be applied to the current embodiment and the method is not limited to any one thereof. However, to help understanding, the current embodiment presents an example in which the target images 110 and 130 are generated based on the depth image 100 and the multi-plane image 120.

For example, by using the depth image 100 obtained by photographing an object from at least one viewpoint or in at least one direction, the target image 110 having a plurality of planes in a depth direction may be generated. When the target image 110 having the plurality of planes is generated by extracting intensity information of each pixel with respect to a depth from the depth image 100, light intensity information of each plane of the target image 110 and light intensity information in an actual space are different from each other, resulting in a significant error in a light forward-propagation process. Thus, a real world observed by humans may be assumed to include incoherent light, and an image of each plane of the target image 110 may be obtained through incoherent light forward-propagation of the intensity information of each plane obtained from the depth image.

In another example, for the multi-plane image 120, the target image 130 may be generated through processing with respect to energy conservation. That is, the target image 130 may be generated by performing energy conservation transform that matches energy of each plane of the multi-plane image 120 by color (R, G, B).

The current embodiment proposes the three-dimensional (3D) target images 110 and 130 including the plurality of planes, but in another example, a target image including one plane may be used. Hereinafter, for convenience, the embodiments will be described based on 3D target images (110, 130) for convenience.

In the current embodiment, it is assumed that the target images 110 and 130 are defined in the method of FIG. 1 or conventional various methods. That is, the current embodiment is not limited to a specific method of generating a target image, and may be implemented using a target image generated by the conventional various methods.

Figure 2:
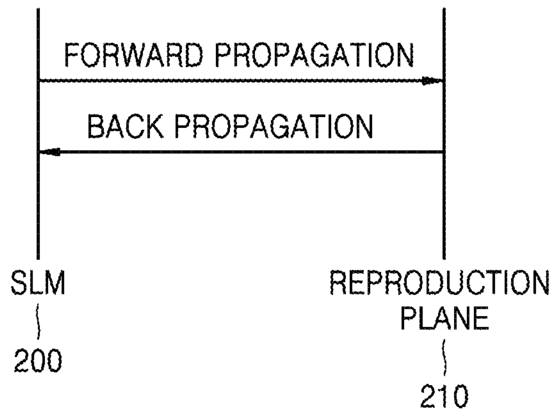
FIG. 2 illustrates the concept of forward propagation and back propagation, according to an embodiment of the present disclosure.

FIG. 2 illustrates the concept of forward propagation and back propagation according to an embodiment of the present disclosure.

Referring to FIG. 2, forward propagation refers to a process of obtaining a holographic image displayed on a reproduction plane 210 of a space through a spatial light modulator (SLM) with respect to a hologram, and back propagation refers to a process of obtaining a hologram on a complex plane 200 of the SLM with respect to the holographic image of the reproduction plane 210.

Figure 3:
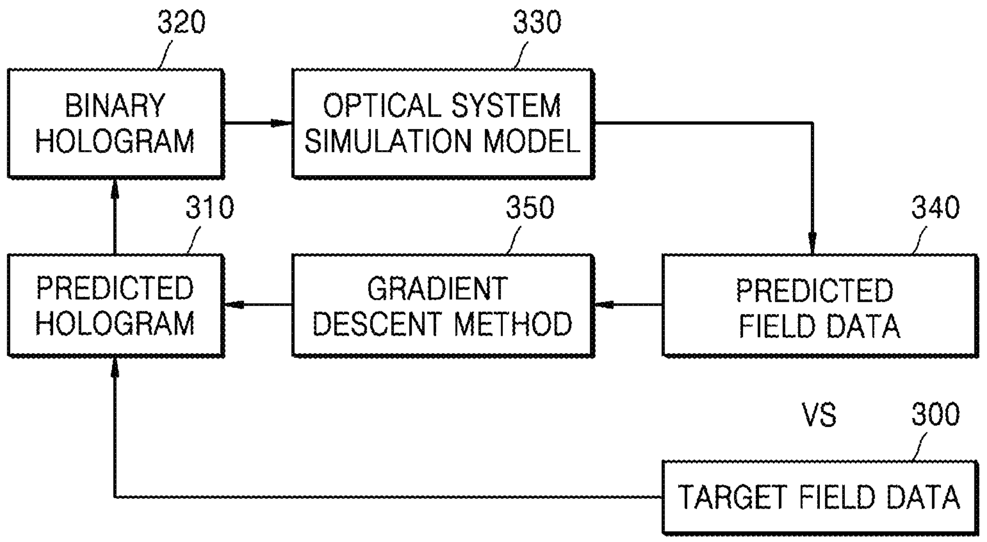
FIG. 3 illustrates an example of a method of optimizing a holographic display, according to an embodiment of the present disclosure.

FIG. 3 illustrates an example of a method of optimizing a holographic display according to an embodiment of the present disclosure.

Referring to FIG. 3, a holographic display (hereinafter, referred to as an 'apparatus') may calculate a hologram on a complex plane of an SLM (hereinafter, referred to as a 'predicted hologram') through back propagation with respect to target field data 300. Herein, the target field data 300 may refer to data having a random phase profile with respect to light intensity of each plane of the target images 110 and 130 shown in FIG. 1. A method of calculating the hologram on the complex plane 200 of FIG. 2 of the SLM through back propagation with respect to the target field data 300 of the reproduction plane 210 of FIG. 2 is already known, and thus will not be further described.

The apparatus may convert the predicted hologram 310 into a binary hologram 320. Each pixel of the predicted hologram may have complex values of light intensity and phase. For example, each pixel of a general hologram may have intensity and phase values of 8-bit data. The apparatus may compare a value of each pixel of the predicted hologram (i.e., an absolute value of a complex value of each pixel) with a predefined reference value to binarize an intensity value of each pixel into 0 or 1, thereby generating a binary hologram. That is, the apparatus may convert the intensity value into '1' when the value of each pixel of the predicted hologram is greater than the reference value, and into 'O' when the value of each pixel of the predicted hologram is less than the reference value, thereby generating the binary hologram 320 having a binary value.

The apparatus may obtain field data (hereinafter, 'predicted field data 340') on a reproduction plane through a forward propagation operation of the binary hologram 320. The apparatus may calculate the predicted field data 340 in forward propagation of the binary hologram 320 to the reproduction plane by using a model simulating an optical system of a holographic display. The optical system simulation model is assumed to be predefined in various manners.

The apparatus may identify an error of a loss function between the predicted field data 340 and the target field data 300. For example, the apparatus may identify an error by using a loss function to accumulatively sum a mean square error (MSE) of each plane of the predicted field data 340 and the target field data 300. Various loss functions for error identification may be applied to the current embodiment.

When an error between the predicted field data 340 and the target field data 300 is greater than or equal to a predefined threshold, the apparatus may back-propagate the predicted field data 340 by using a stochastic gradient descent (SGD) method to reduce the error of the loss function, thus generating the new predicted hologram 310. The apparatus may convert the new predicted hologram 310 into the binary hologram 320 and forward-propagate the binary hologram 320 to generate the new predicted field data 340. The apparatus may repeat generation of the predicted hologram 310 and generation of the predicted field data 340 until the error of the loss function between the predicted field data 340 and the target field data 300 is less than the threshold. When the error in loss function between the predicted field data 340 and the target field data 300 is less than the threshold, the apparatus may output the recently generated predicted hologram 310 as an optimized hologram for the target field data 300.

Figure 4:
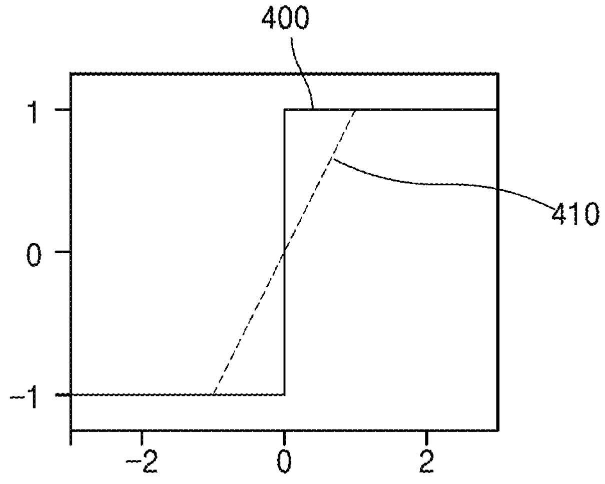
FIG. 4 illustrates a modified example of a binary operator according to an embodiment of the present disclosure.

FIG. 4 illustrates a modified example of a binary operator according to an embodiment of the present disclosure.

Referring to FIG. 4, each pixel of a binary hologram has a binary value of 0 or 1, such that a binary operator 400 indicating each pixel may be a non-differentiable function. The apparatus may calculate a differential value by replacing the binary operator 400 with a hyperbolic tangent function H tan h(x) 410 to enable differentiation of the binary operator 400 in a back-propagation process applying the SGD method.

Figure 5:
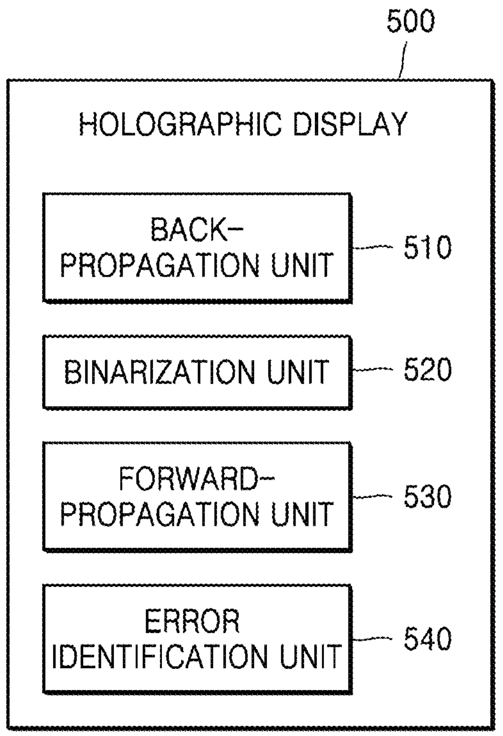
FIG. 5 illustrates a structure of an example of a holographic display device according to an embodiment of the present disclosure.

FIG. 5 illustrates a structure of an example of a holographic display device according to an embodiment of the present disclosure.

Referring to FIG. 5, a holographic display 500 may include a back-propagation unit 510, a binarization unit 520, a forward-propagation unit 530, and an error identification unit 540. The holographic display 500 may be implemented with a device forming an optical system, such as a spatial light modulator (SLM), etc., and a computing device including a component for hologram optimization of the current embodiment. For example, the component according to the current embodiment may be implemented with software and loaded on a memory, and then may be executed by a processor.

The back-propagation unit 510 may back-propagate target field data including a plurality of planes to a complex plane of the SLM to generate a predicted hologram.

The binarization unit 520 may convert a predicted hologram into a binary hologram. The binarization unit 520 may compare a magnitude of a value on a complex plane corresponding to each pixel of the predicted hologram with a predefined reference value to convert a value of the pixel into a binary value of 0 or 1.

The forward-propagation unit 530 may generate predicted field data in which the binary hologram is forward-propagated to a reproduction plane, by using an optical system simulation model.

The error identification unit 540 may calculate a loss function between the predicted field data and the target field data. The error identification unit 540 may repeat generation of a new predicted hologram by using the SGD method until a value of the loss function is less than a predefined threshold. That is, when the error is less than the threshold, the back-propagation unit 510 may generate a new predicted hologram for the predicted field data to minimize the value of the loss function by using the SGD method, the binarization unit 520 may generate a new binary hologram for the new predicted hologram, and the forward-propagation unit 530 may generate new predicted field data for the new binary hologram.

Figure 6:
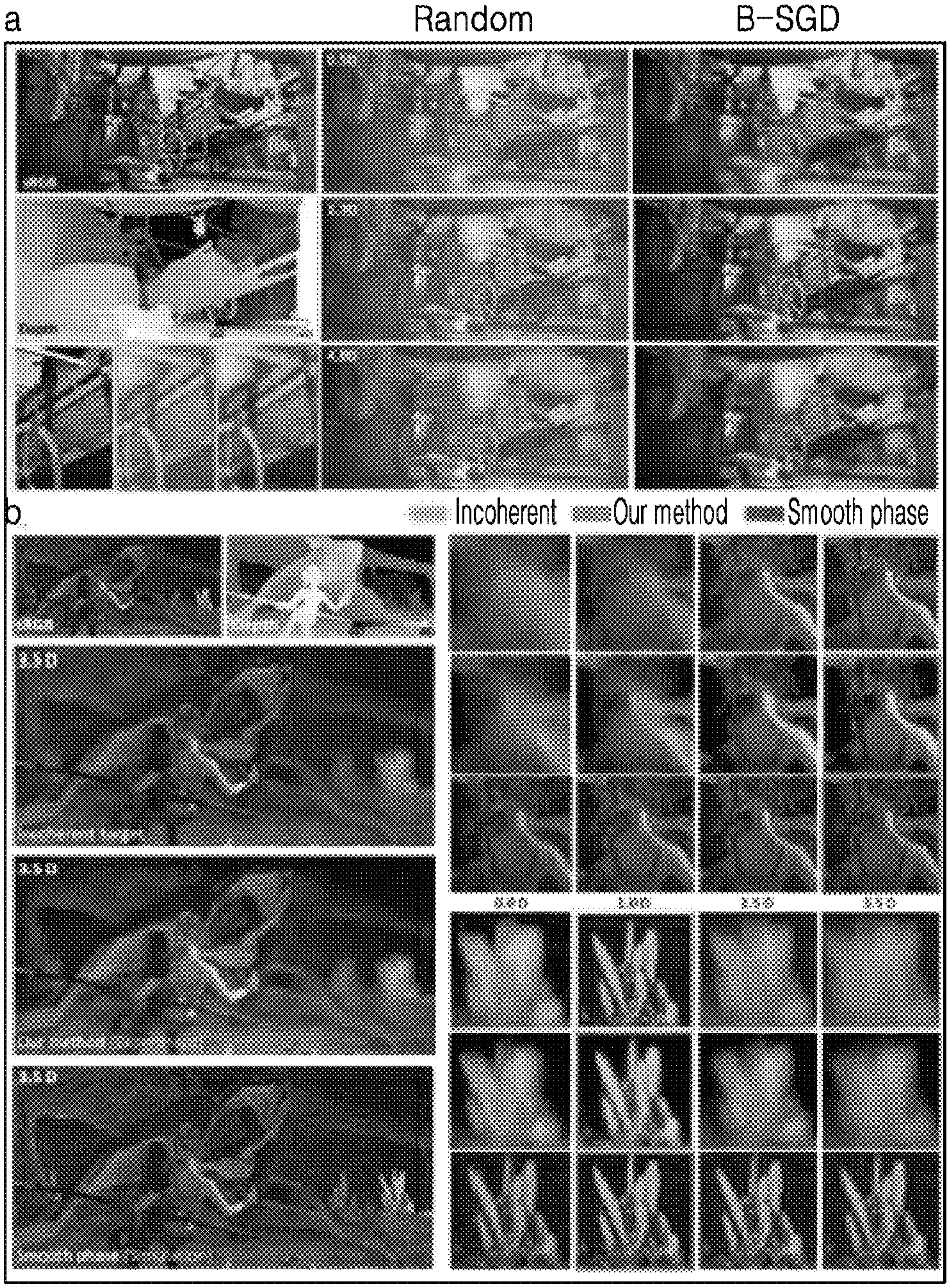
FIGS. 6 and 7 illustrate an experimental example to which a method of optimizing a holographic display is applied, according to an embodiment of the present disclosure.
Figure 7:
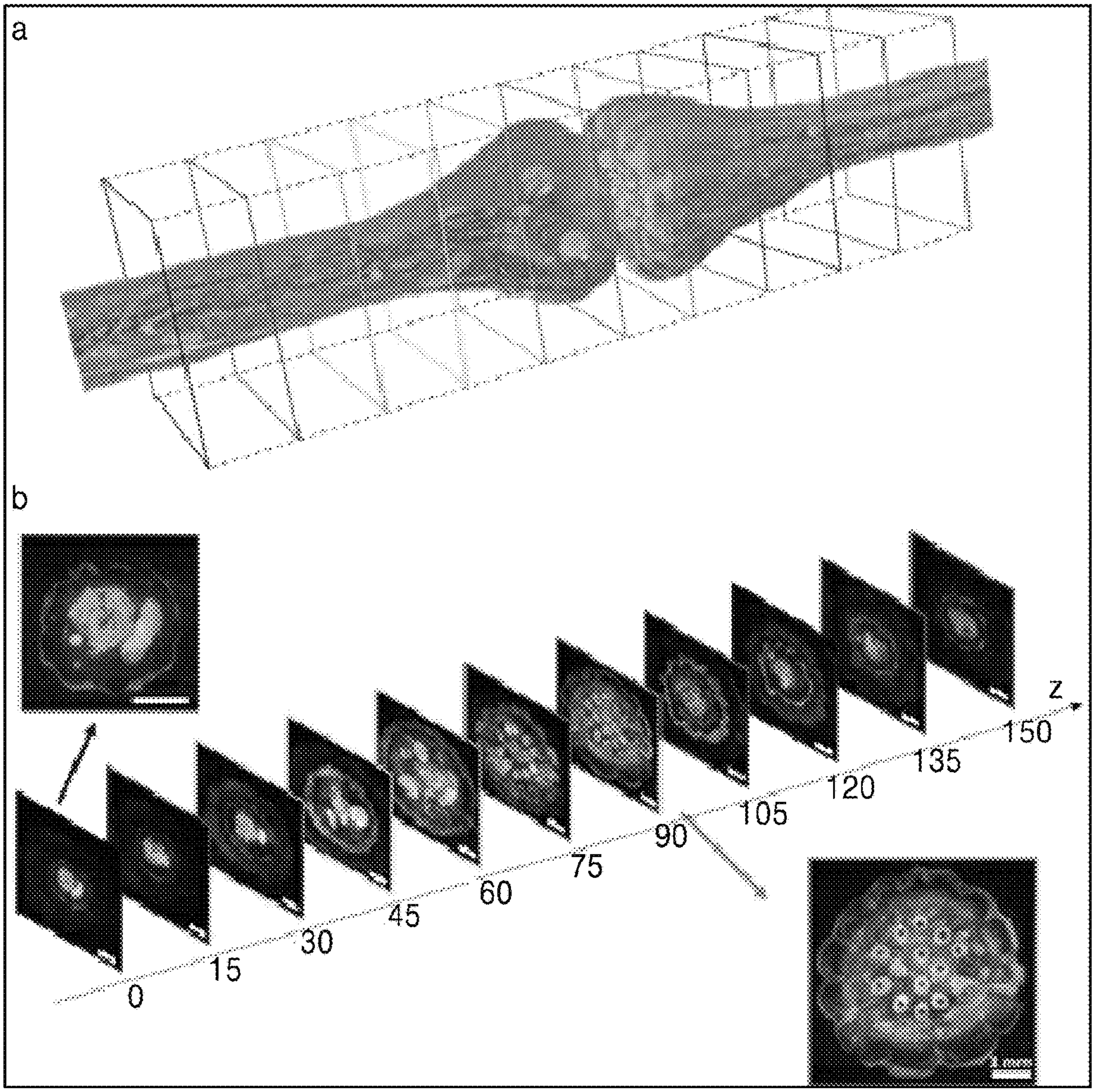

FIGS. 6 and 7 illustrate an experimental example to which a method of optimizing a holographic display is applied, according to an embodiment of the present disclosure.

Referring to FIG. 6, a holographic image is shown in which a depth ranging from 0.5 diopter (D), which is the reciprocal of a distance from the eye in meters, to 4.0 D is reproduced through a holographic display. FIG. 6A shows a holographic image reproduced in a direct binary hologram encoding method, which is a conventional method, and a method according to the current embodiment, when one depth image is provided. A low-contrast image is reproduced according to the conventional method, but a high-contrast image is reproduced using the method according to the current embodiment. FIG. 6B compares a method (smooth phase) of providing a high-quality image by limiting a phase in a 2D hologram image with a method according to the current embodiment. When there is a target image generated through incoherent forward-propagation described with reference to FIG. 1, an image reproduced using the method according to the current embodiment is similar to a target image.

Referring to FIG. 7, independent hologram reconstruction with respect to a depth is shown. When a 3D object is present with information from multiple cross-sections, such as MRI, CT, etc., reconstruction of a target image may be possible without consideration of occlusion as described with reference to FIG. 1. FIG. 7A shows a 3D sample of a nerve bundle elongated in the depth direction. In this case, the image may be reconstructed as shown in FIG. 7B by generating a hologram based on the image from the obtained several cross-sections by using the method according to the current embodiment. The method according to the current embodiment may implement a random wave front in a depth range in that the image may be reconstructed with independent planes with respect to a depth.

Each embodiment of the present disclosure may also be implemented as a computer-readable program code on a computer-readable recording medium. The computer-readable recording medium may include all types of recording devices in which data that is readable by a computer system is stored. Examples of the computer-readable recording medium may include read-only memory (ROM), random access memory (RAM), compact-disc ROM (CD-ROM), a solid state drive (SSD), an optical data storage device, etc. The computer-readable recording medium may be distributed over computer systems connected through a network to store and execute a computer-readable code in a distributed manner.

So far, embodiments have been described for the present disclosure. It would be understood by those of ordinary skill in the art that the present disclosure may be implemented in a modified form within a scope without departing from the essential characteristics of the present disclosure. Therefore, the disclosed embodiments should be considered in a descriptive sense rather than a restrictive sense. The scope of the present specification is not described above, but in the claims, and all the differences in a range equivalent thereto should be interpreted as being included in the present disclosure.

The invention claimed is:

1. A method of optimizing a holographic display, the method comprising:

generating a predicted hologram by back-propagating target field data comprising a plurality of planes in a depth direction to a complex plane of a spatial light modulator (SLM);

converting the predicted hologram into a binary hologram;

generating predicted field data by forward-propagating the binary hologram to a reproduction plane through an optical system simulation model;

calculating a loss function between the predicted field data and the target field data;

generating a new predicted hologram for the predicted field data by using a stochastic gradient descent (SGD) method; and repeating the converting into the binary hologram to the generating of the new predicted hologram until a value of the loss function is less than a predefined threshold.

2. The method of claim 1, wherein the converting into the binary hologram comprises comparing a magnitude of a value of a complex plane corresponding to each pixel of the predicted hologram with a predefined reference value to convert a value of the pixel into a binary value of 0 or 1.

3. The method of claim 1, wherein the generating of the new predicted hologram comprises replacing a binary function indicating a binary value with a hyperbolic tangent function and applying the SGD method thereto.

4. A non-transitory computer-readable recording medium having recorded thereon a computer program for executing the method of claim 1.

* * * * *